US011303576B2

(12) United States Patent
Modi et al.

(10) Patent No.: US 11,303,576 B2
(45) Date of Patent: Apr. 12, 2022

(54) ACCURATE ANALYTICS, QUALITY OF SERVICE AND LOAD BALANCING FOR INTERNET PROTOCOL FRAGMENTED PACKETS IN DATA CENTER FABRICS

(71) Applicant: Cisco Technology, Inc., San Jose, CA (US)

(72) Inventors: Ajay K. Modi, San Jose, CA (US); Atul Garg, Fremont, CA (US); Murukanandam K. Panchalingam, Dublin, CA (US); Umamaheswararao Karyampudi, Fremont, CA (US); Munish Mehta, Fremont, CA (US)

(73) Assignee: Cisco Technology, Inc., San Jose, CA (US)

(*) Notice: Subject to any disclaimer, the term of this patent is extended or adjusted under 35 U.S.C. 154(b) by 39 days.

(21) Appl. No.: 16/656,353

(22) Filed: Oct. 17, 2019

(65) Prior Publication Data

US 2021/0119925 A1 Apr. 22, 2021

(51) Int. Cl.
*H04L 12/50* (2006.01)
*H04L 47/2483* (2022.01)
*H04L 45/7453* (2022.01)
*H04L 47/125* (2022.01)
*H04L 49/9057* (2022.01)
*H04L 49/00* (2022.01)
*H04L 12/18* (2006.01)

(52) U.S. Cl.
CPC ...... *H04L 47/2483* (2013.01); *H04L 12/1886* (2013.01); *H04L 45/7453* (2013.01); *H04L 47/125* (2013.01); *H04L 49/3072* (2013.01); *H04L 49/9057* (2013.01)

(58) Field of Classification Search
CPC ......... G06F 8/61; G06F 8/65; H04L 2212/00; H04L 41/0809; H04L 41/082; H04L 41/0853; H04L 45/742; H04L 61/2592; H04L 67/2842; H04L 69/324; H04W 16/20; H04W 24/02; H04W 84/12; H04W 84/18; H04W 88/08
See application file for complete search history.

(56) References Cited

U.S. PATENT DOCUMENTS

| 8,472,341 B2 * | 6/2013 | Battestilli | H04L 49/351 |
| | | | 370/252 |
| 8,532,107 B1 * | 9/2013 | Ghosh | H04L 45/00 |
| | | | 370/392 |
| 9,736,057 B2 * | 8/2017 | Chinni | H04L 45/14 |
| 10,038,766 B2 * | 7/2018 | Pfister | H04L 45/742 |
| 2009/0238209 A1 * | 9/2009 | Ju | H04L 69/326 |
| | | | 370/473 |

(Continued)

*Primary Examiner* — Phuc H Tran
(74) *Attorney, Agent, or Firm* — Patterson + Sheridan, LLP

(57) ABSTRACT

A network device receives a fragmented packet of an internet protocol (IP) packet. The fragmented packet is subsequently received relative to an initial fragmented packet of the IP packet and includes a first set of tuple information. The network device determines an entry of a hash table associated with the IP packet, based on the first set of tuple information and a fragment identifier (ID) within the fragmented packet. The network device retrieves a second set of tuple information associated with the fragmented packet from the hash table entry, and transmits an indication of the first and second sets of tuple information.

20 Claims, 9 Drawing Sheets

(56) References Cited

U.S. PATENT DOCUMENTS

| | | | |
|---|---|---|---|
| 2010/0020800 A1* | 1/2010 | Abe | H04L 45/7453 |
| | | | 370/392 |
| 2011/0016209 A1* | 1/2011 | Moncaster | H04L 47/11 |
| | | | 709/224 |
| 2012/0224581 A1* | 9/2012 | Battestilli | H04L 49/3009 |
| | | | 370/392 |
| 2016/0050140 A1* | 2/2016 | Chinni | H04L 45/14 |
| | | | 709/242 |
| 2018/0103129 A1* | 4/2018 | Dumitrescu | H04L 45/7453 |
| 2020/0287829 A1* | 9/2020 | Lam | H04L 45/7453 |
| 2020/0336370 A1* | 10/2020 | Hong | H04L 41/0816 |

* cited by examiner

ACCURATE ANALYTICS, QUALITY OF SERVICE AND LOAD BALANCING FOR INTERNET PROTOCOL FRAGMENTED PACKETS IN DATA CENTER FABRICS

TECHNICAL FIELD

Embodiments presented in this disclosure generally relate to communication networks and, more specifically, to techniques for improving analytics of internet protocol (IP) fragmented packets in data center fabrics by accurately identifying the IP fragmented packets.

BACKGROUND

Data center fabrics can be deployed with a local-site controller managing a set of switches using various types of architectures. One example data center design called the network-based spine-and-leaf architecture was developed to overcome several limitations of older network architectures. This architecture has been proven to deliver high-bandwidth, low-latency, and non-blocking server-to-server connectivity. In this architecture, every lower-tier switch (leaf layer) is connected to each of the top-tier switches (spine layer) in a full-mesh topology. The leaf layer consists of access switches that connect to devices such as servers. The spine layer is the backbone of the network and is responsible for interconnecting all leaf switches.

Spine-leaf architectures generally support unicast and multi-destination traffic between a source and one or more destinations. Unicast traffic refers to network traffic that is routed from one source to one destination. Multi-destination traffic refers to traffic that is routed to two or more destinations, and generally constitutes a substantial amount of the traffic in today's data center fabrics. For example, multi-destination traffic can include broadcast traffic (e.g., traffic sent to all devices on a network), multicast traffic (e.g., traffic sent to multiple, selected addresses on a network), and unknown unicast traffic (e.g., unicast traffic sent with unknown destination addresses).

A data center fabric may support the routing of fragmented traffic across the fabric. For example, in cases where the size of a given packet is larger than the maximum packet size supported by the fabric, the packet may be fragmented into smaller fragmented packets prior to entering the fabric. The fragmented packets may then be reassembled to form a single packet after exiting the fabric. However, one challenge with supporting fragmented traffic within data center fabrics is that fabrics are generally unable to accurately identify which traffic flow the fragmented traffic belongs to. This can lead to inaccurate analytics, quality of service and load balancing of the fragmented traffic within the data center, significantly impacting the efficiency and performance of the data center.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
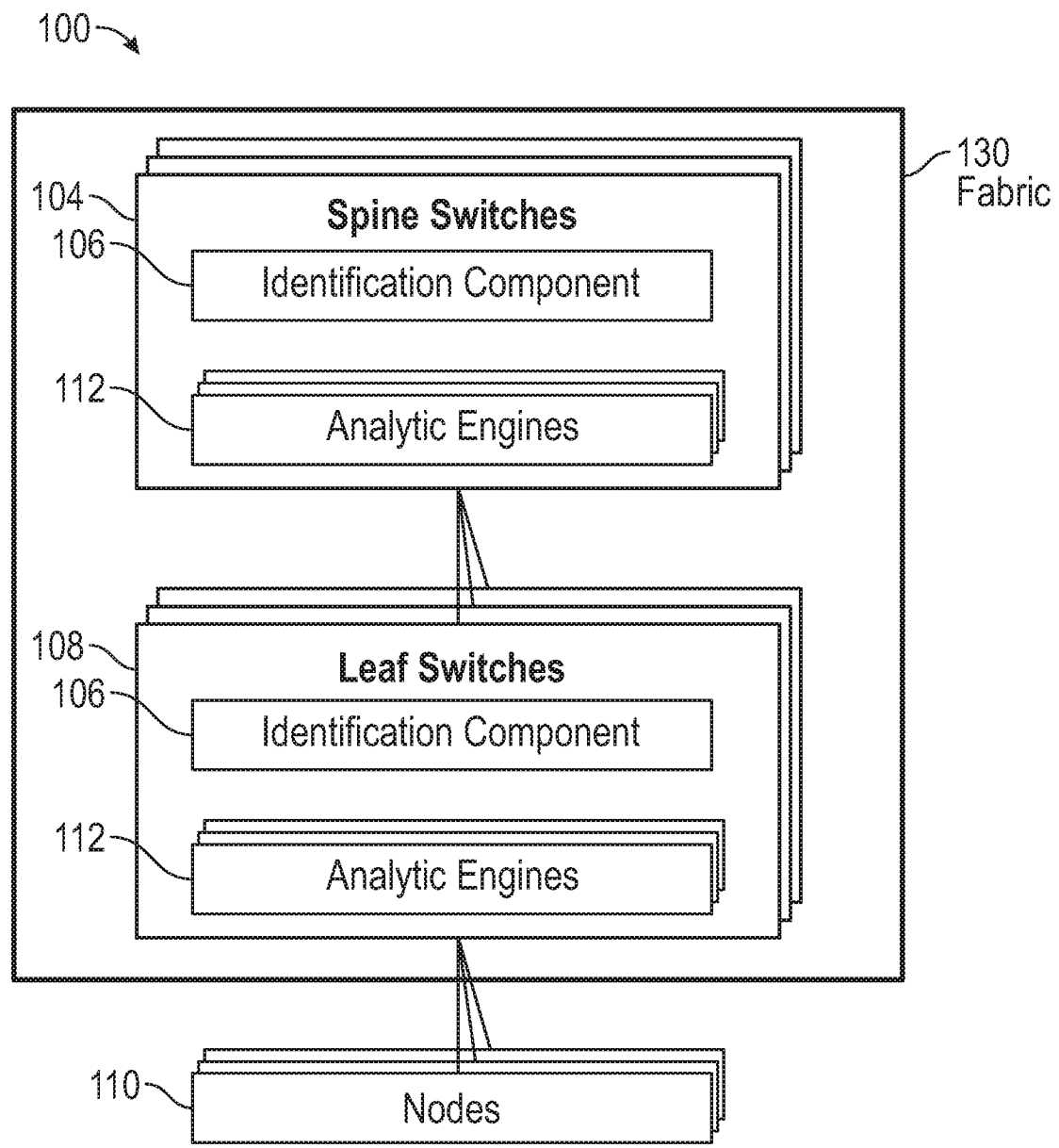
FIG. 1 is a block diagram of an example network architecture that includes a leaf-spine fabric, according to one embodiment described herein.

One embodiment presented in this disclosure provides a method performed by a network device. The method generally includes receiving a fragmented packet of an internet protocol (IP) packet. The fragmented packet is subsequently received relative to an initial fragmented packet of the IP packet and comprises a first set of tuple information. The method also includes determining an entry of the hash table associated with the IP packet, based on the first set of tuple information and a fragment identifier (ID) within the fragmented packet. The method further includes retrieving a second set of tuple information associated with the fragmented packet from the entry of the hash table, and transmitting an indication of the first set of tuple information and the second set of tuple information.

Another embodiment presented in this disclosure provides a network device. The network device generally includes a processor, a hash table, and a memory containing a program that, when executed by the processor, performs an operation. The operation includes receiving a fragmented packet of an IP packet. The fragmented packet is subsequently received relative to an initial fragmented packet of the IP packet and comprises a first set of tuple information. The operation also includes determining an entry of the hash table associated with the IP packet, based on the first set of tuple information and a fragment ID within the fragmented packet. The operation further includes retrieving a second set of tuple information associated with the fragmented packet from the entry of the hash table, and transmitting an indication of the first set of tuple information and the second set of tuple information.

Another embodiment presented in this disclosure provides a computer-readable medium. The computer-readable medium includes computer program code that, when executed by one or more processors, performs an operation. The operation generally includes receiving, at a network device, a fragmented packet of an IP packet. The fragmented packet is subsequently received relative to an initial fragmented packet of the IP packet and comprises a first set of tuple information. The operation also includes determining, by the network device, an entry of a hash table associated with the IP packet, based on the first set of tuple information and a fragment ID within the fragmented packet. The operation further includes retrieving, by the network device, a second set of tuple information associated with the fragmented packet from the entry of the hash table. The operation further yet includes transmitting, by the network device, an indication of the first set of tuple information and the second set of tuple information.

EXAMPLE EMBODIMENTS

A data center can provide various types of analytics and services that help tenants (or customers) manage their data within the data center. For example, the data center can provide load balancing services, quality of service (QoS) analytic services, security policies, etc., for data traffic routed through the data center. Typically, the data center uses the full (or complete) tuple information (e.g., the 5-tuple components, which include the source IP, destination IP, source port, destination port, and protocol) within the header of each packet to identify the traffic flow that the packet belongs to, and select the appropriate service chain to provide the desired services to the traffic flow.

In many cases, however, fragmented traffic may not carry the full set of tuple information, which is used to identify the traffic flow. For example, assume an IP packet is fragmented (or divided) into three packets, including a first (initial) packet, a second (middle) packet, and a third (last) packet, before entering a data center fabric. In this example, the first (initial) packet carries the full set of tuple information, but the second and third packets carry a subset of the full tuple information. For example, the second and third packets may not carry the layer 4 (L4) information (e.g., source port and destination port) of the 5-tuple components.

Due to the unavailability of the full set of tuple information for fragmented traffic, data center fabrics generally treat fragmented traffic differently than non-fragmented traffic. For example, data center fabrics typically do not use the L4 information to select the service chains for fragmented traffic. In some cases, however, this can cause the data center fabric to treat IP fragments that belong to different traffic flows in the same manner. For example, there may be multiple applications exchanging data (via different source/destination ports) between the same source/destination IP. In this scenario, the data center may not be able to determine (e.g., distinguish between) the traffic flows the various different IP fragments belong to, using a subset of the full tuple information (e.g., without the source/destination ports). This can limit the data center fabric's ability to provide accurate analytics and services for IP fragmented traffic. For example, due to this limitation, the data center fabric cannot apply services, such as QoS, load balancing, service chaining, etc., for fragmented traffic in the proper manner.

To address the above issues, embodiments provide techniques for accurately identifying IP fragmented traffic within a data center fabric. Specifically, network devices in the data center fabric can be configured with an identification component that identifies the traffic flow each IP fragmented packet belongs to, and sends information regarding the traffic flow associated with the IP fragmented packet to the appropriate analytics engine(s). As described in more detail below, embodiments may use a dynamic flow hash table (DFHT) to store tuple information associated with IP fragmented packets.

In one embodiment, upon receiving an initial IP fragmented packet, the identification component may retrieve a first set of tuple information and a fragment ID (also referred to herein as IP-ID) from the initial IP fragmented packet. For example, the initial IP fragmented packet may include the full (or complete) set of tuple information (e.g., the 5-tuple components), which can be used to identify the traffic flow that the initial IP fragmented packet belongs to, and the fragment ID may be used to identify the different fragments of the original (non-fragmented) IP packet. In one example, the first set of tuple information may include a first subset (or partial set) (e.g., 3-tuple components, such as the source IP, destination IP, and protocol) of the full set of tuple information (e.g., 5-tuple components). The identification component may determine a hash table entry of the DFHT based on the first set of tuple information and the fragment ID, and store a second set of tuple information (retrieved from the initial IP fragmented packet) at the hash table entry of the DFHT. The second set of tuple information, for example, may include a second subset of the full tuple information, such as the L4 information (e.g., source/destination ports) associated with the initial IP fragmented packet. The identification component may send an indication of the traffic flow associated with the initial IP fragmented packet (e.g., the first and second sets of tuple information) to one or more analytic engines.

For subsequently received IP fragments (that do not include the full set of tuple information), embodiments can use the DFHT to determine the missing set of tuple information associated with the subsequent IP fragments. For example, in one embodiment, upon receiving an (subsequent) IP fragmented packet that does not contain the full set of tuple information, the identification component may retrieve the (first set of) tuple information (e.g., source/destination IPs, protocol) that is included within the IP fragmented packet along with the fragment ID of the IP fragmented packet, and determine a hash table entry of the DFHT (associated with the IP fragmented packet) based on the tuple information and fragment ID. The identification component may retrieve the missing (second set of) tuple information for the IP fragmented packet from the determined hash table entry of the DFHT. The identification component may identify the traffic flow that the IP fragmented packet belongs to, based on the full set of tuple information for that IP fragmented packet, and send an indication of the traffic flow (e.g., the first and second sets of tuple information) associated with the subsequent IP fragmented packet to the same analytic engine(s) (or service chains) that the corresponding initial IP fragment and/or other non-fragmented packets of the same flow were sent to. In some embodiments, the identification component can remove (or invalidate) missing tuple information associated with a given traffic flow from the DFHT, after receiving and identifying the last IP fragmented packet of an IP packet.

In this manner, embodiments can accurately identify the traffic flows that IP fragmented packets within the data center fabric belong to. This, in turn, allows the data center fabric to perform accurate analytics and other services for the IP fragmented packets, increasing the efficiency and performance of data centers (relative to conventional techniques).

Note that while many of the following embodiments are discussed with reference to a data center fabric that uses a spine-leaf architecture, the techniques discussed herein are not limited to the spine-leaf architecture. The techniques may be extended to any network architecture in which access network devices communicate with each other via multiple core network devices providing redundancy in terms of the path a data flow may take between two access network devices.

FIG. 1 is a block diagram of an example network architecture 100 that includes a leaf-spine fabric 130, according to one embodiment. As shown, the network architecture 100 includes multiple spine switches 104 (also referred to as core network switches) and multiple leaf switches 108 (also referred to as access network switches), where each leaf switch 108 is connected to each spine switch 104. The spine switches 104 together are often referred to as the spine of the leaf-spine fabric 130.

The network architecture 100 also includes one or more nodes 110 coupled to one or more of the leaf switches 108. Each of the nodes 110 may include a server, a virtual machine, a software application, etc. In some embodiments, each node 110 communicates with another node 110 using the leaf-spine fabric 130 for routing data traffic (or traffic flows) between the nodes. In some embodiments, each node 110 can communicate with another node (e.g., in another site or data center) using the leaf-spine fabric 130 for routing data via a communications network (e.g., the Internet). Although not shown, the network architecture 100 may include a controller (or a central entity) that manages and configures policies on each of the leaf and spine switches in the leaf-spine fabric 130. In such cases, management or control plane traffic between the controller and the leaf-spine fabric 130 may be forwarded (or exchanged) via a communications network (e.g., the Internet).

In some embodiments, the network architecture 100 may be implemented as a Cisco Application Centric Infrastructure (ACI) or Software Defined Network (SDN). The Cisco ACI fabric includes a leaf-spine architecture similar to the leaf-spine fabric 130 shown in FIG. 1. From a management perspective, the ACI fabric may include a central controller (e.g., SDN controller) (also referred to as the Application Policy Infrastructure Controller (APIC) (which is not shown) that manages and configures the policy on each of the switches in the ACI fabric. The APIC acts as a central repository for all policies and has the ability to rapidly deploy and re-deploy hardware, as needed, based on network performance. The Cisco ACI may also serve as a platform for other services that are performed within the data center or cloud environment. For example, through the use of the central controller, third party services may be integrated for advanced security, load balancing, and monitoring. Note that ACI is merely used as an example. The embodiments herein are not limited to such and can be used with any other suitable SDN platform.

One or more of the spine switches 104 and/or one or more of the leaf switches 108 may include an identification component 106 and one or more analytic engines 112. The identification component 106 and the analytic engines 112 can include hardware components, software modules, or combinations thereof. In this particular embodiment, each spine switch 104 and leaf switch 108 includes an identification component 106 and analytic engine(s) 112. In other embodiments, the ingress and/or egress network devices may include an identification component 106 and analytic engine(s) 112. In some embodiments, one or more of the analytic engine(s) 112 may be located on other computing systems within the network architecture 100 (e.g., as opposed to within the spine and leaf switches in the leaf-spine fabric 130).

The identification component 106 can receive IP fragmented packets (also referred to herein as IP fragments) and identify the traffic flow(s) that the IP fragmented packets belong to. In one embodiment, the identification component 106 can use a DFHT to store a set of tuple information (e.g., L4 information) that is typically missing from the headers of IP fragmented packets (subsequent to the initial IP fragmented packet). The identification component 106 may then use the DFHT to identify which traffic flows subsequent IP fragmented packets belong to, e.g., by retrieving the missing tuple information from the DFHT. This process is described in more detail below, e.g., with respect to FIGS. 4A, 4B, and 4C.

After identifying an IP fragmented packet, the identification component 106 may send an indication of the traffic flow associated with the IP fragmented packet to one or more analytic engines 112. For example, if the network architecture 100 is configured to perform security policies for a traffic flow X and receives an IP fragmented packet belonging to traffic flow X, the identification component 106 may send an indication that the IP fragmented packet belongs to traffic flow X to an analytic engine 112 that implements security policies. The analytic engines 112 are generally responsible for implementing analytics and other services for customers. For example, the analytic engines 112 can perform services including, but not limited to, load balancing, QoS analytics, security monitoring and analytics, application segmentation, workload protection, application whitelisting, etc. While the analytic engines 112 are depicted in FIG. 1 as being implemented by one or more of the spine switches 104 and leaf switches 108, in other embodiments, the analytic engines 112 may be implemented by other computing systems (e.g., a central controller) in the network architecture 100.

Figure 2A:
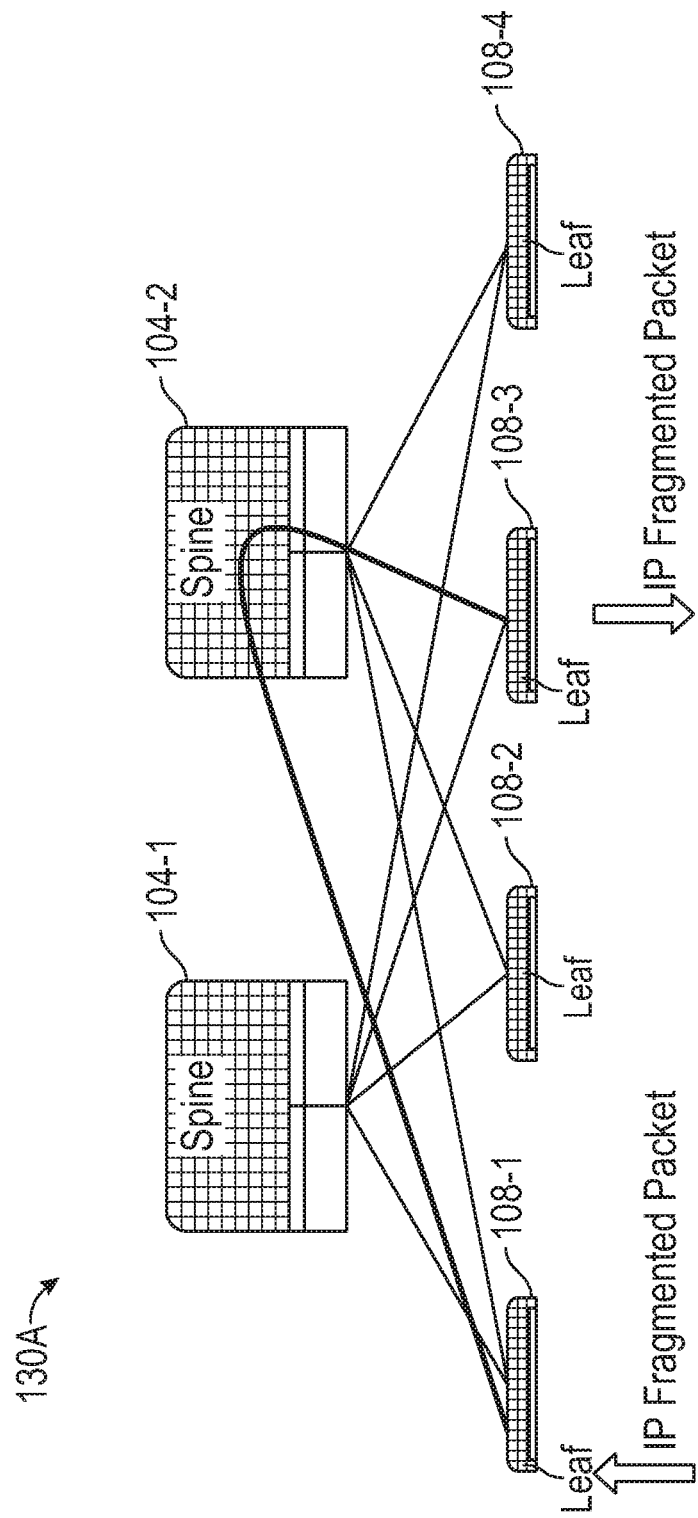
FIG. 2A depicts an example deployment of a leaf-spine fabric, according to one embodiment described herein.

FIG. 2A depicts an example deployment of a leaf-spine fabric 130A, in which the techniques presented herein can be used to accurately identify IP fragmented packets within the leaf-spine fabric, according to one or more embodiments. As shown, the leaf-spine fabric 130A includes two spine switches 104-1 and 104-2 and four leaf switches 108-1, 108-2, 108-3, and 108-4. Note, however, that the number of leaf and spine switches depicted is used as merely a reference example, and that the leaf-spine fabric 130A can include any number of leaf and spine switches.

In this embodiment, leaf switch 108-1 may receive an IP fragmented packet and use the identification component 106 to identify the traffic flow that the IP fragmented packet belongs to. The IP fragmented packet may be an initial IP fragment of an IP packet or a subsequent (e.g., middle or last) IP fragment of the IP packet. After identifying the traffic flow associated with the IP fragmented packet, the identification component 106 may perform analytics on the IP fragmented packet, e.g., using one or more analytic engines 112. The leaf switch 108-1 may forward the IP fragmented packet(s) via the spine switch 104-2 to leaf switch 108-3.

In one embodiment, the techniques described herein may be implemented solely at the ingress network device (e.g., leaf switch 108-1). In another embodiment, the techniques described herein may be implemented at the ingress and egress network device (e.g., leaf switch 108-3). For example, in this embodiment, the leaf switch 108-3 may also use its identification component 106 and/or the analytic engines 112 to perform analytics on the IP fragmented packet, e.g., similar to leaf switch 108-1. In yet another embodiment, the techniques described herein may be implemented solely at the egress network device (e.g., leaf switch 108-3). In yet a further embodiment, each network device in the leaf-spine fabric 130A that receives the IP fragmented packet (e.g., leaf switch 108-1, spine switch 104-2, and leaf switch 108-3) may implement the techniques described herein. In this embodiment, for example, each network device may be configured to perform a different type of analytics or services for the IP fragmented packet.

Figure 2B:
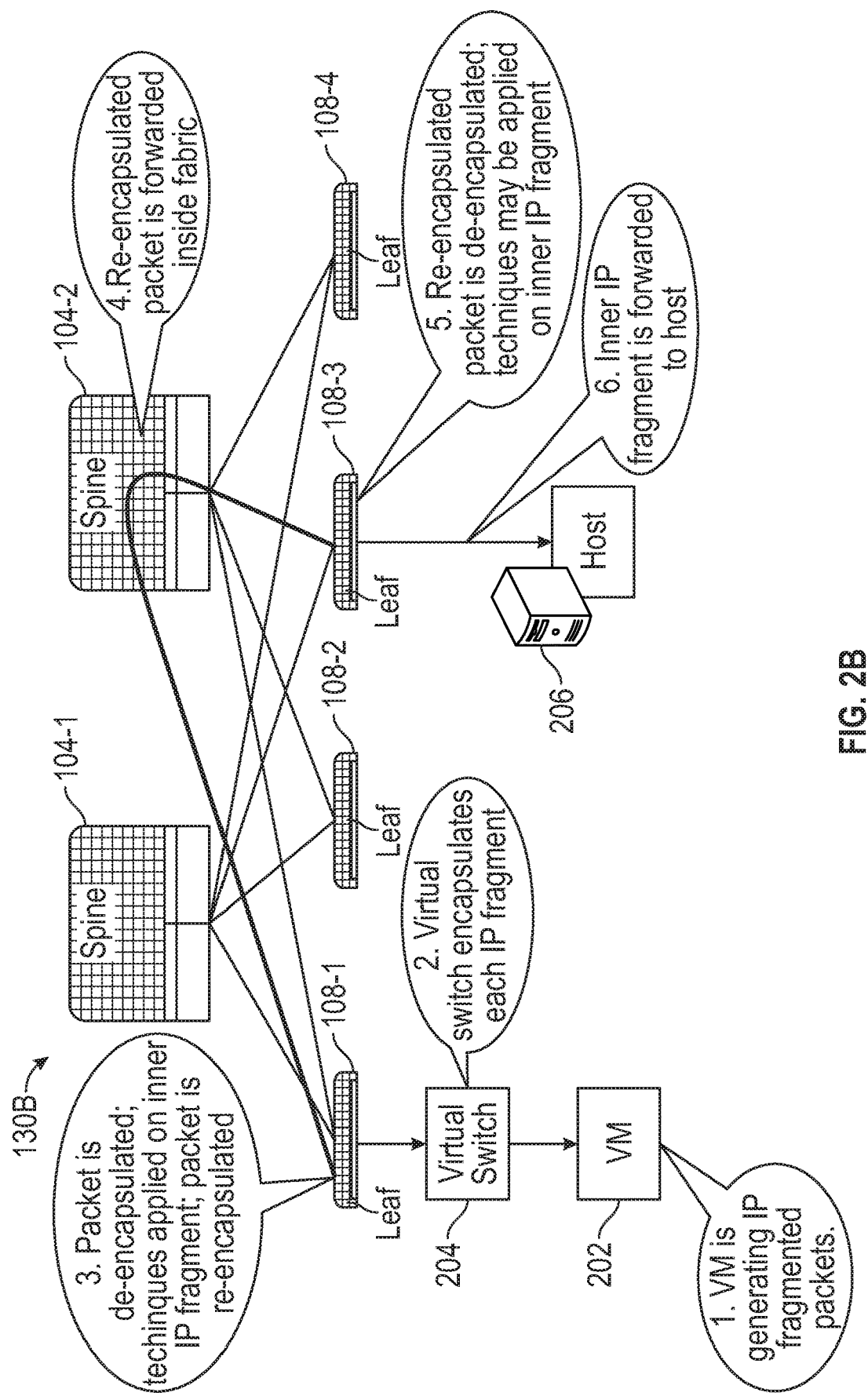
FIG. 2B depicts another example deployment of a leaf-spine fabric, according to one embodiment described herein.

FIG. 2B depicts an example deployment of a leaf-spine fabric 130B, in which the techniques presented herein can be used to accurately identify IP fragmented packets within the leaf-spine fabric, according to one or more embodiments. Similar to leaf-spine fabric 130A, the leaf-spine fabric 130B includes two spine switches 104-1 and 104-2 and four leaf switches 108-1, 108-2, 108-3, and 108-4. Note, however, that the leaf-spine fabric 130B can include any number of leaf and spine switches.

As shown, a virtual machine 202 (e.g., one of the nodes 110 depicted in FIG. 1) may generate one or more IP fragmented packets and send the IP fragmented packet(s) to a virtual switch 204 (step 1). The virtual switch 204 may encapsulate each IP fragment and send encapsulated IP fragment(s) to the leaf switch 108-1 (step 2). In one embodiment, the virtual switch 204 may use a first encapsulation protocol, such as external Virtual Extensible LAN (eVXLAN), to perform encapsulation of each IP fragmented packet. The leaf switch 108-1 may de-encapsulate each encapsulated IP fragment and apply the techniques described herein on each inner (de-encapsulated) IP fragmented packet (step 3). That is, the leaf switch 108-1 may use its identification component 106 to determine the traffic flow that each inner IP fragmented packet belongs to, and perform analytics on the inner IP fragmented packet using one or more analytic engines 112, based on the determination.

The leaf switch 108-1 may re-encapsulate the IP fragmented packet (e.g., after performing analytics on the IP fragmented packet) and forward the IP fragmented packet to another network device, via the leaf-spine fabric 130B (step 3). In one embodiment, the leaf switch 108-1 may use a second encapsulation protocol, such as internal VxLAN (iVXLAN), to perform the re-encapsulation of each IP fragmented packet. In this particular embodiment, the leaf switch 108-1 may forward the re-encapsulated IP fragmented packet(s) via the spine switch 104-2 to leaf switch 108-3 (step 4). At leaf switch 108-3, the re-encapsulated IP fragmented packet(s) may be de-encapsulated, and the techniques described herein may be applied on each inner (de-encapsulated) IP fragmented packet (step 5). That is, the leaf switch 108-3 may use its identification component 106 to determine the traffic flow that each inner IP fragmented packet belongs to, and perform analytics on the inner IP fragmented packet using one or more analytic engines 112, based on the determination. After the analysis, the leaf switch 108-3 may forward the inner IP fragmented packet(s) to a host 206, where the IP fragmented packets may be reassembled into a single IP packet.

Note that while FIG. 2B depicts the techniques described herein being implemented at the ingress network device (e.g., leaf switch 108-1) and the egress network device (e.g., leaf switch 108-3), the techniques presented herein may be implemented solely at the ingress network device, solely at the egress network device, or at each network device in the leaf-spine fabric 130B that receives an IP fragmented packet (e.g., leaf switch 108-1, spine switch 104-2, and leaf switch 108-3).

Figure 3:
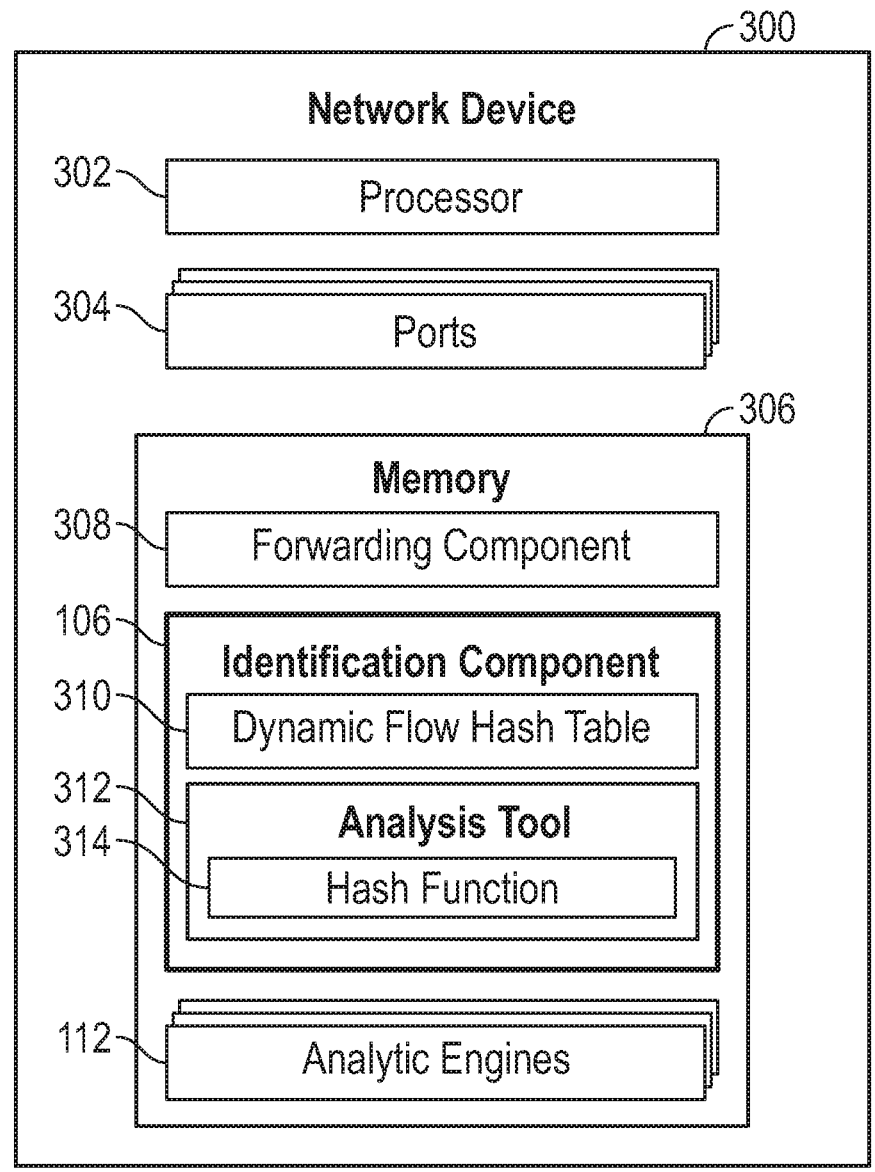
FIG. 3 illustrates an example network device configured with an identification component, according to one embodiment described herein.

FIG. 3 illustrates an example network device 300 configured with an identification component 106, according to one embodiment. In one embodiment, the network device 300 is representative of a leaf switch (e.g., leaf switch 108 illustrated in FIG. 1). In one embodiment, the network device 300 is representative of a spine switch (e.g., spine switch 104 illustrated in FIG. 1).

The network device 300 includes a processor 302, communication ports 304, and memory 306. The processor 302 may be any processing element capable of performing the functions described herein. The processor 302 represents a single processor, multiple processors, a processor with multiple cores, and combinations thereof. The communication ports 304 facilitate communication between the network device 300 and other network devices (e.g., spine switch 104, leaf switch 108, etc.) and/or nodes 110. The memory 306 may be either volatile or non-volatile memory and include RAM, flash, cache, disk drives and the like. Although shown as a single entity, the memory 306 may be divided into different memory storage elements such as RAM and one or more hard disk drives.

As shown, the memory 306 includes a forwarding component 308, an identification component 106, and one or more analytic engines 112, each of which can include hardware components, software modules, or combinations thereof. The forwarding component 308 can transmit (or forward) traffic received by the network device 300 to another network device 300 in the leaf-spine fabric 130 and/or to a node 110. The identification component 106 can identify (or determine) the traffic flows that IP fragmented packets (received by the network device 300) belong to. As shown, the identification component 106 includes a DFHT 310 and an analysis tool 312. The DFHT 310 is a hash table that includes multiple entries indexed with a hash index. The identification component 106 may use the analysis tool 312 to determine the hash index for a given IP fragmented packet received by the network device 300. For example, the analysis tool 312 may evaluate a set of tuple information (e.g., source IP, destination IP, and protocol) and fragment ID retrieved from the IP fragmented packet using the hash function 314 in order to determine the hash index.

In one embodiment, the identification component 106 may use the resulting hash index to determine which entry of the DFHT 310 to store a set of tuple information for one or more IP fragmented packets. For example, if the hash index is determined for an initial IP fragmented packet (e.g., the IP fragmented packet includes a full set of tuple information), the identification component 106 may store L4 information retrieved from the initial IP fragmented packet at the entry of the DFHT 310 corresponding to the resulting hash index.

In another embodiment, the identification component 106 may use the resulting hash index to determine which entry of the DFHT 310 to retrieve a set of tuple information for one or more IP fragmented packets. For example, if the hash index is determined for an IP fragmented packet that is not the initial IP fragmented packet of a traffic flow (e.g., the IP fragmented packet does not include a full set of tuple information), the identification component 106 may retrieve the L4 information associated with the IP fragmented packet from the entry of the DFHT 310 corresponding to the resulting hash index.

Once the identification component 106 retrieves L4 information associated with a given IP fragmented packet, the identification component 106 can combine the L4 information (e.g., source/destination port) with the 3-tuple components (e.g., source/destination IP and protocol) in order to determine the traffic flow that the IP fragmented packet belongs to. The identification component 106 may send an indication of the traffic flow to one or more analytic engines 112. As noted above, the analytic engines 112 may be able to perform various types of analytics and services for the data center fabric, including but not limited to, QoS analytics, load balancing, security policies, etc. In this manner, embodiments enable network devices 300 in the leaf-spine fabric 130 to accurately identify IP fragmented packets within the leaf-spine fabric 130, which in turn, enables the leaf-spine fabric 130 to provide accurate analytics and other services for IP fragmented packets flowing through the leaf-spine fabric 130.

Figure 4A:
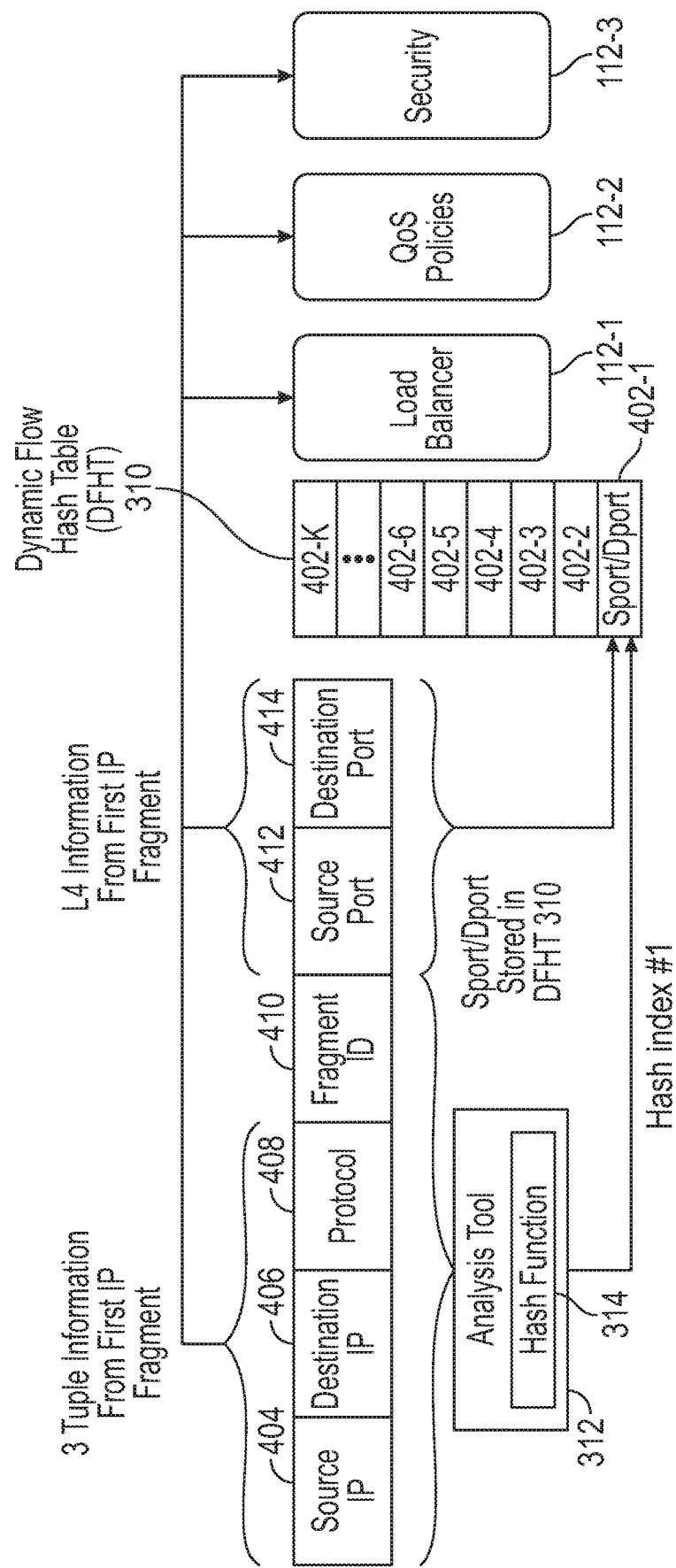
FIG. 4A depicts an example workflow for processing an initial fragmented packet, according to one embodiment described herein.
Figure 4B:
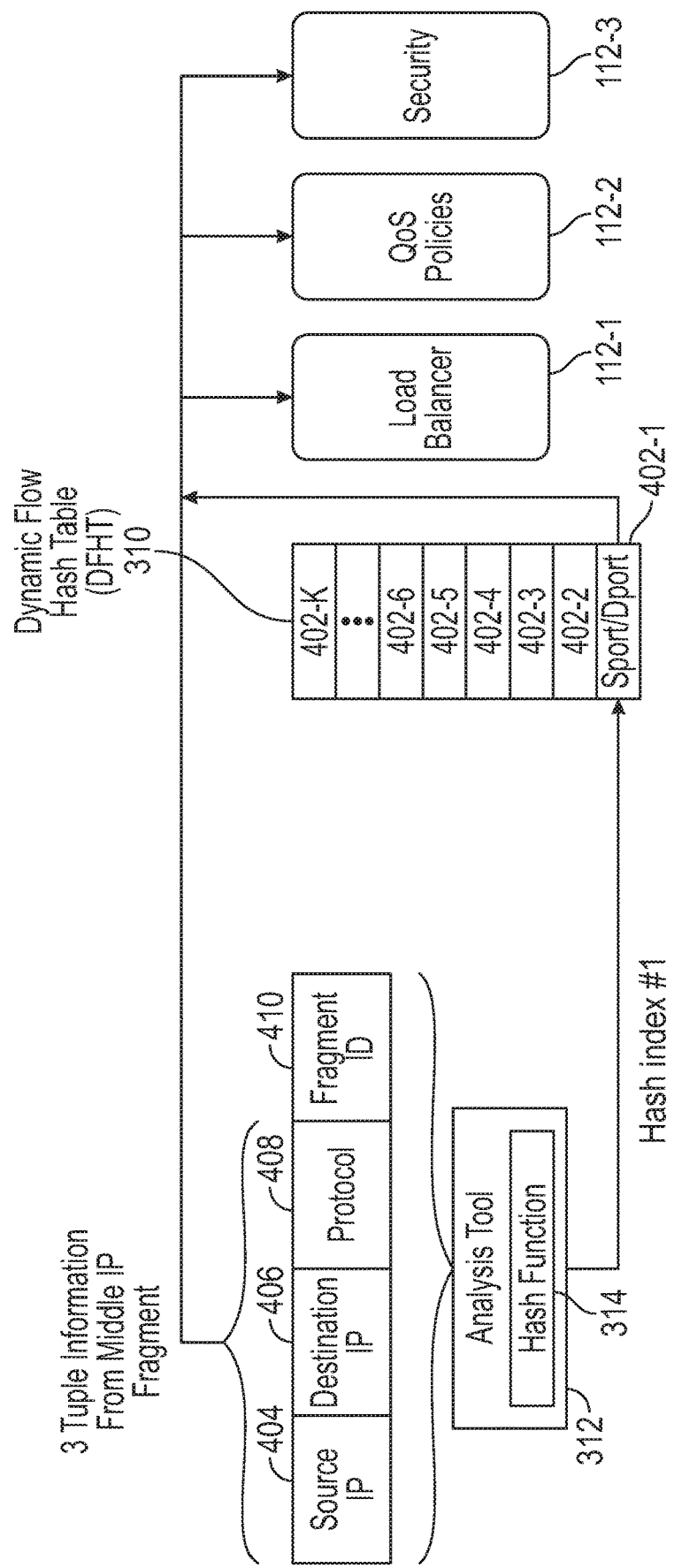
FIG. 4B depicts an example workflow for processing a middle fragmented packet, according to one embodiment described herein.
Figure 4C:
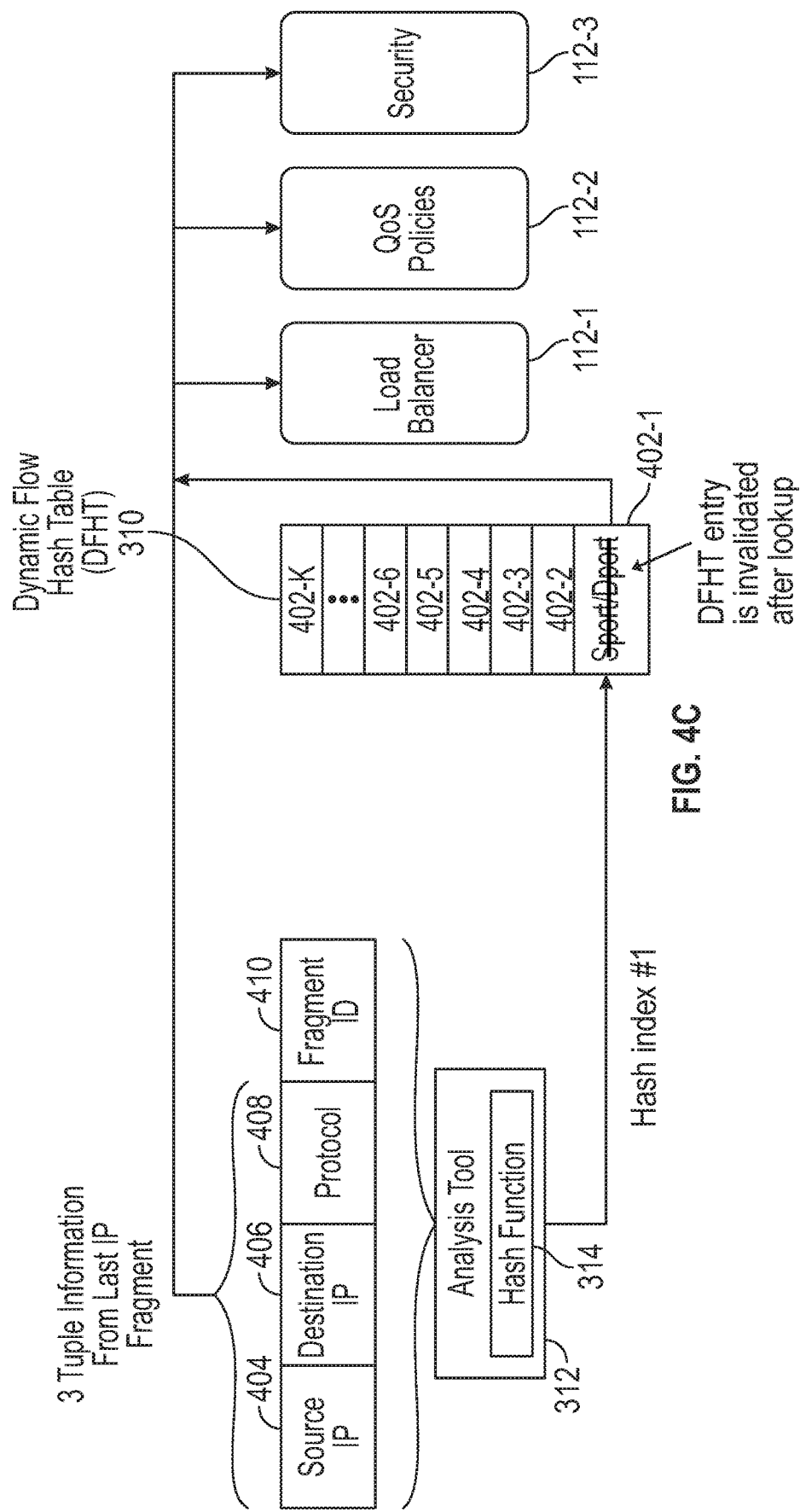
FIG. 4C depicts an example workflow for processing a last fragmented packet, according to one embodiment described herein.

FIGS. 4A-4C depict an example workflow for accurately identifying IP fragmented packets within a leaf-spine fabric 130, according to one embodiment. In particular, FIG. 4A depicts a workflow for processing an initial IP fragmented packet of an IP packet, FIG. 4B depicts a workflow for processing a middle IP fragmented packet (subsequent to the initial IP fragmented packet) of an IP packet, and FIG. 4C depicts a workflow for processing a last IP fragmented packet (subsequent to the middle IP fragmented packet) of an IP packet. Note that while FIGS. 4A-4C assume that an IP packet is split into three IP fragments, the techniques described herein can be applied to any number of fragments of an IP packet.

Referring first to FIG. 4A, the identification component 106 may receive an initial (first) IP fragmented packet that includes a full set of tuple information (e.g., source IP 404, destination IP 406, protocol 408, source port 412, and destination port 414) and a fragment ID 410. The fragment ID 410 is a unique identifier, which is used to identify the different fragments of the original IP packet. In one embodiment, the identification component 106 may determine that an IP fragmented packet is the initial IP fragmented packet of an IP packet based on the offset field and more_fragment bit of the IP fragmented packet. For example, if the offset field is zero and the more_fragment bit is set (e.g., equal to 1), the identification component 106 may determine that the IP fragmented packet is the initial IP fragmented packet.

Upon receiving the initial IP fragmented packet, the identification component 106 may create an entry in the DFHT 310 at a hash index determined based on information carried in the header of the initial IP fragmented packet. As noted above, the DFHT 310 may include multiple (hash) entries that are indexed by a hash index. In this particular embodiment, for example, the DFHT 310 includes hash entries 402 1-K. As shown, the analysis tool 312 inputs a first set of the tuple information (e.g., source IP 404, destination IP 406, and protocol 408) and the fragment ID 410 (from the header of the initial IP fragmented packet) into the analysis tool 312, which evaluates the information using hash function 314 in order to determine a hash index (e.g., index #1) of the DFHT 310. The identification component 106 then stores a second set of the tuple information (e.g., source port 412 and destination port 414) (from the header of the initial IP fragmented packet) into the hash entry 402-1 of the DFHT 310 corresponding to the hash index (e.g., index #1). The identification component 106 may also send the full set of the tuple information for the initial IP fragmented packet to one or more analytic engines 112 (e.g., load balancer 112-1, QoS policies 112-2, and security policies 112-3).

Subsequently, as shown in FIG. 4B, the identification component 106 may receive a (middle) IP fragmented packet that does not include the full set of tuple information. In one embodiment, the identification component 106 may determine that an IP fragmented packet is the middle IP fragmented packet of an IP packet based on the offset field and more_fragment bit of the IP fragmented packet. For example, if the offset field is non-zero and the more_fragment bit is set (e.g., equal to 1), the identification component 106 may determine that the IP fragmented packet is a middle IP fragmented packet of an IP packet.

Here, the identification component 106 retrieves the set of tuple information (e.g., 3-tuples, such as the source IP 404, destination IP 406, and protocol 408) and the fragment ID 410 from the header of the IP fragmented packet, and inputs the information into the analysis tool 312. The analysis tool 312 evaluates the information using hash function 314 and determines the hash index (e.g., hash index #1) of the DFHT 310 corresponding to the IP fragmented packet. The resulting hash index provides the hash entry of the DFHT 310, where the missing tuple information (e.g., L4 information) associated with the IP fragmented packet is stored. Here, for example, the identification component 106 retrieves the source port and destination port associated with the IP fragmented packet from hash entry 402-1 of the DFHT 310. Once retrieved, the identification component 106 can send the full set of tuple information associated with the (middle) IP fragmented packet to one or more analytic engines 112 (e.g., load balancer 112-1, QoS policies 112-2, and security policies 112-3). In this manner, the analytic engines 112 can provide the same treatment for the (middle) IP fragmented packet that was provided to the initial IP fragmented packet and/or other non-fragmented frames of the same traffic flow.

Subsequently, as shown in FIG. 4C, the identification component 106 may receive a (last) IP fragmented packet that does not include the full set of tuple information. In one embodiment, the identification component 106 may determine that an IP fragmented packet is the last IP fragmented packet of an IP packet based on the offset field and more_fragment bit of the IP fragmented packet. For example, if the offset field is non-zero and the more_fragment bit is not set (e.g., equal to 0), the identification component 106 may determine that the IP fragmented packet is the last IP fragmented packet of an IP packet.

Here, similar to FIG. 4B, the identification component 106 may evaluate the set of tuple information (e.g., source IP 404, destination IP 406, and protocol 408) and the fragment ID 410 retrieved from the header of the IP fragmented packet using the hash function 314 to determine the hash index (e.g., hash index #1) of the DFHT 310 corresponding to the IP fragmented packet. After retrieving the missing tuple information (e.g., source port and destination port) associated with the IP fragmented packet from the hash entry 402-1 of the DFHT 310 corresponding to the hash index, the identification component 106 may send the full set of tuple information associated with the IP fragmented packet to one or more analytic engines 112 (e.g., load balancer 112-1, QoS policies 112-2, and security policies 112-3). In addition, after reading the missing tuple information from the hash entry 402-1 of the DFHT 310, the identification component 106 may invalidate (or remove) the contents of the hash entry 402-1 of the DFHT 310. In this manner, the analytic engines 112 can provide the same treatment for the (last) IP fragmented packet that was provided to the initial IP fragmented packet, middle IP fragmented packet, and/or other non-fragmented frames of the same traffic flow.

Figure 5:
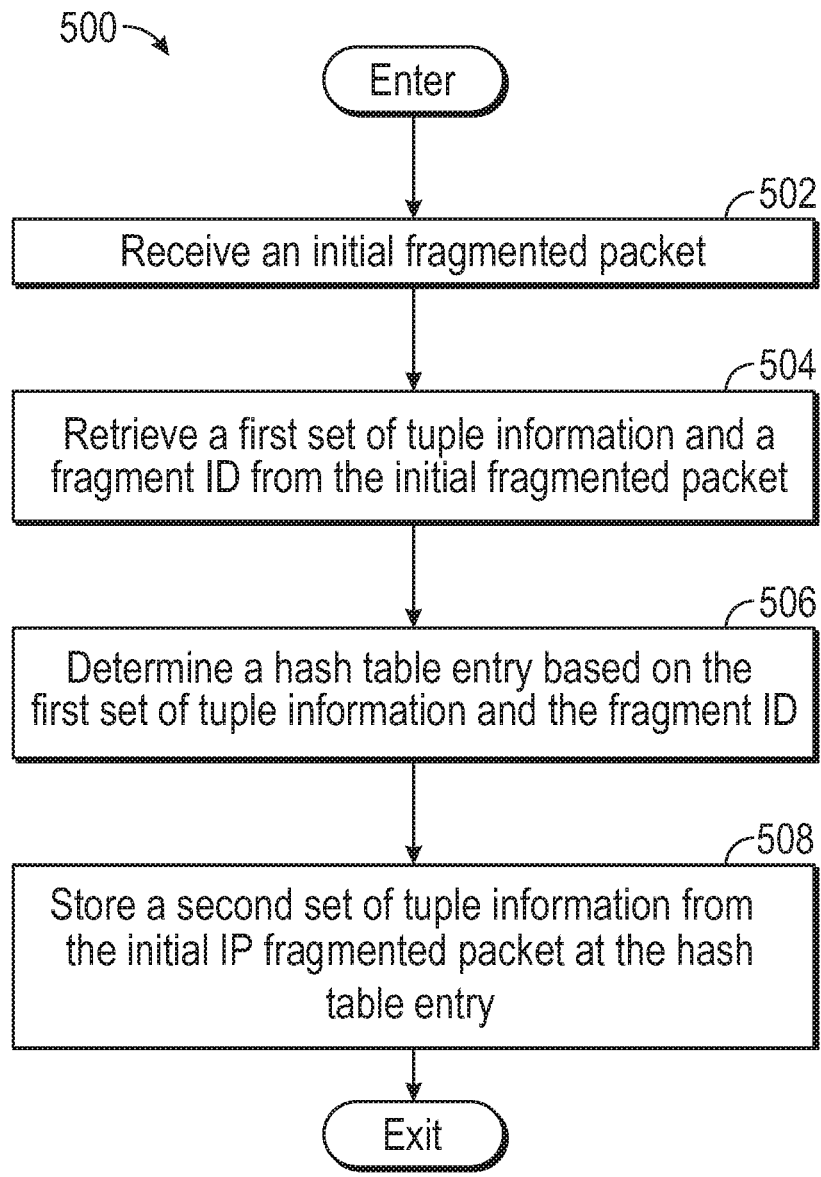
FIG. 5 is a flowchart for storing tuple information that can be used to identify fragmented packets, according to one embodiment described herein.

FIG. 5 is a flowchart of a method 500 for storing tuple information that can be used to identify IP fragmented packets, according to one embodiment. The method 500 may be performed by a network device (e.g., network device 300).

The method 500 may enter at block 502, where the network device receives an initial fragmented packet of an IP packet. For example, the network device may determine that the offset field of the fragmented packet is zero and that the more_fragment bit of the fragmented packet is set (e.g., equal to 1). At block 504, the network device retrieves a first set of tuple information (e.g., source IP 404, destination IP 406, and protocol 408) and a fragment ID (e.g., fragment ID 410) from the initial fragmented packet.

At block 506, the network device determines an entry of a hash table (e.g., DFHT 310) based on the first set of tuple information and the fragment ID. For example, the network device may evaluate the first set of tuple information and the fragment ID with a hash function (e.g., hash function 314) in order to determine the hash table entry. At block 508, the network device stores a second set of tuple information (e.g., source port 412 and destination port 414) from the initial fragmented packet at the entry of the hash table. In one embodiment, the network device may use the stored set of tuple information in the hash table to accurately determine the traffic flow that is associated with subsequent received IP fragments.

Figure 6:
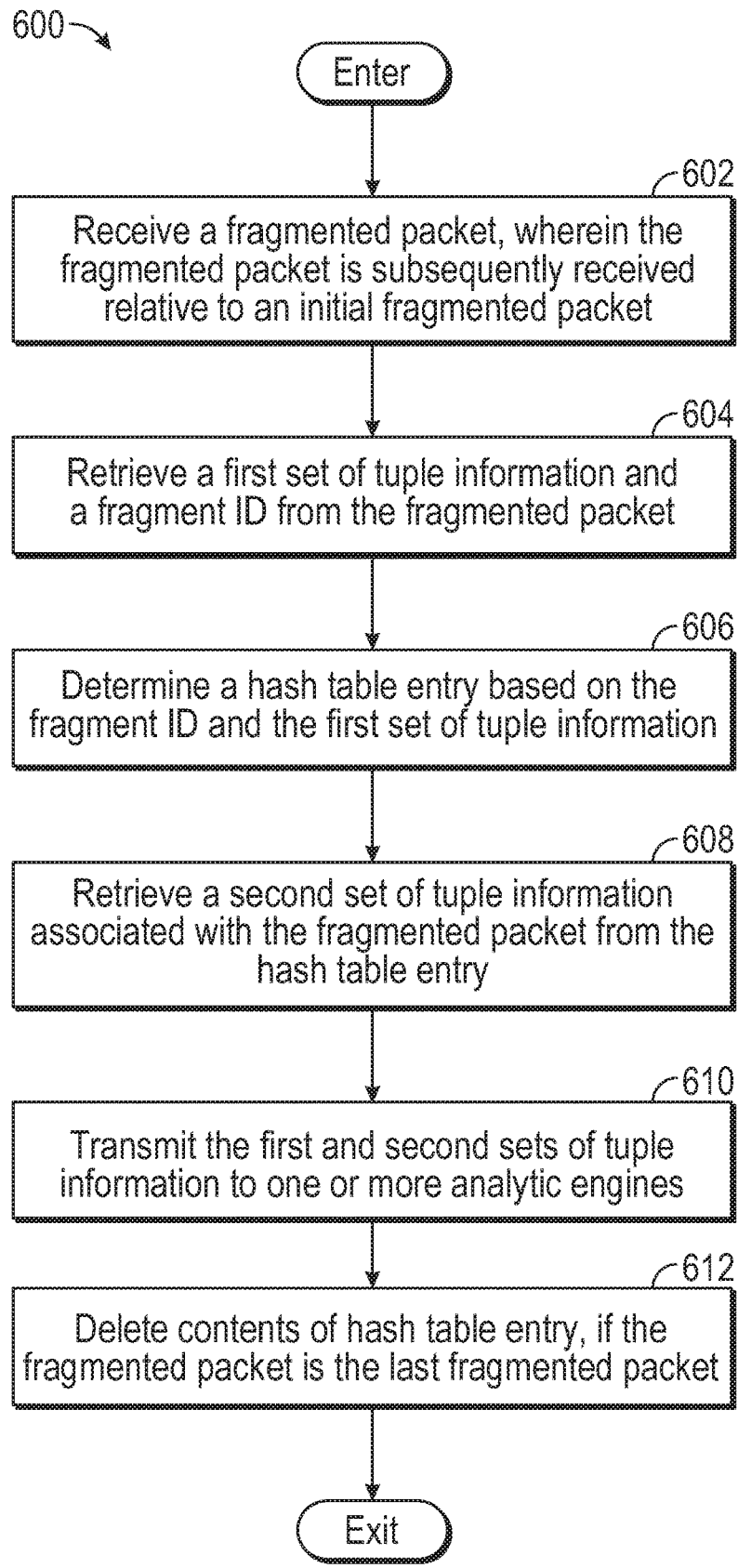
FIG. 6 is a flowchart for identifying fragmented packets, according to one embodiment described herein.

FIG. 6 is a flowchart of a method 600 for identifying IP fragmented packets, according to one embodiment. The method 600 may be performed by a network device (e.g., network device 300).

The method 600 may enter at block 602, where the network device receives a fragmented packet of an IP packet, where the fragmented packet is subsequently received relative to an initial fragmented packet of the IP packet. In one embodiment, the fragmented packet may be a middle fragmented packet of the IP packet. For example, the network device may determine that the offset field of the fragmented packet is non-zero and that the more_fragment bit of the fragmented packet is set (e.g., equal to 1). In another embodiment, the fragmented packet may be a last fragmented packet of the IP packet. For example, the network device may determine that the offset field of the fragmented packet is non-zero and that the more_fragment bit of the fragmented packet is not set (e.g., equal to 0).

At block 604, the network device retrieves a first set of tuple information (e.g., source IP 404, destination IP 406, and protocol 408) and a fragment ID (e.g., fragment ID 410) from the fragmented packet. At block 606, the network device determines an entry of a hash table (e.g., DFHT 310) based on the fragment ID and the first set of tuple information. For example, the network device may evaluate the first set of tuple information and the fragment ID with a hash function (e.g., hash function 314) in order to determine the hash table entry. At block 608, the network device retrieves a second set of tuple information (e.g., source port 412 and destination port 414) associated with the fragmented packet from the hash table entry.

At block 610, the network device transmits the first and second sets of tuple information (e.g., to one or more analytic engines 112). At block 612, the network device deletes the contents of the hash table entry, if the fragmented packet is the last fragmented packet of an IP packet. As noted, the network device can determine whether the fragmented packet is the last fragmented packet of an IP packet, based on the offset field and more_fragment bit of the fragmented packet. The method 600 may then exit.

As noted, while embodiments use a spine-leaf fabric as an example network architecture in which network devices can accurately identify the flows belonging to IP fragmented packet and perform accurate analytics and services for IP fragmented packets, the techniques may be extended to any network architecture in which access network devices communicate with each other via multiple core network devices providing redundancy in terms of the path a data flow may take between two access network devices. For example, the techniques may be extended to traffic from a data center interconnect (DCI) or inter-pod network (IPN). Further, the techniques presented herein can be applied to IPv4 traffic and/or IPv6 traffic. In the case of IPv6 traffic, the fragment ID may be retrieved from the IPv6 fragment extension header, and the hash index into the DFHT may be determined based on the fragment ID in the IPv6 fragment extension header and other information (e.g., source IP, destination IP, and next header field) in the IPv6 header.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A computer-implemented method, comprising:
receiving, at a network device, a fragmented packet of an internet protocol (IP) packet, wherein the fragmented packet is subsequently received relative to an initial fragmented packet of the IP packet and wherein the fragmented packet comprises a first set of tuple information;
determining, by the network device, an entry of a hash table associated with the IP packet, based on the first set of tuple information and a fragment identifier (ID) within the fragmented packet;
retrieving, by the network device, a second set of tuple information associated with the fragmented packet from the entry of the hash table;
transmitting, by the network device, an indication of the first set of tuple information and the second set of tuple information; and
upon determining, by the network device, that the fragmented packet is a last fragmented packet of the IP packet, invalidating, by the network device, the entry of the hash table after retrieving the second set of tuple information from the entry of the hash table.

2. The computer-implemented method of claim 1, further comprising:
receiving, at the network device, the initial fragmented packet of the IP packet, wherein the initial fragmented packet comprises the first set of tuple information and the second set of tuple information;
determining, by the network device, the entry of the hash table based on the first set of tuple information and a fragment ID within the initial fragmented packet; and
storing, by the network device, the second set of tuple information at the entry of the hash table.

3. The computer-implemented method of claim 1, further comprising determining, by the network device, a traffic flow associated with the fragmented packet based on the first set of tuple information and the second set of tuple information.

4. The computer-implemented method of claim 1, wherein the first set of tuple information comprises a partial set of tuple information used for determining a traffic flow associated with the fragmented packet.

5. The computer-implemented method of claim 1, wherein the first set of tuple information comprises a source IP, a destination IP, and a protocol.

6. The computer-implemented method of claim 1, wherein the second set of tuple information comprises a source port and a destination port.

7. The computer-implemented method of claim 1, wherein the indication of the first set of tuple information and the second set of tuple information is transmitted to a computing system that performs at least one of (i) load balancing, (ii) security monitoring, or (iii) quality of service (QoS) analytics for traffic within a network.

8. A network device, comprising:
- a processor;
- a hash table; and
- a memory containing a program that, when executed by the processor, performs an operation comprising:
  - receiving a fragmented packet of an internet protocol (IP) packet, wherein the fragmented packet is subsequently received relative to an initial fragmented packet of the IP packet and wherein the fragmented packet comprises a first set of tuple information;
  - determining an entry of the hash table associated with the IP packet, based on the first set of tuple information and a fragment identifier (ID) within the fragmented packet;
  - retrieving a second set of tuple information associated with the fragmented packet from the entry of the hash table;
  - transmitting an indication of the first set of tuple information and the second set of tuple information; and
  - upon determining that the fragmented packet is a last fragmented packet of the IP packet, invalidating the entry of the hash table after retrieving the second set of tuple information from the entry of the hash table.

9. The network device of claim 8, the operation further comprising:
- receiving the initial fragmented packet of the IP packet, wherein the initial fragmented packet comprises the first set of tuple information and the second set of tuple information;
- determining the entry of the hash table based on the first set of tuple information and a fragment ID within the initial fragmented packet; and
- storing the second set of tuple information at the entry of the hash table.

10. The network device of claim 8, the operation further comprising determining a traffic flow associated with the fragmented packet based on the first set of tuple information and the second set of tuple information.

11. The network device of claim 8, wherein the first set of tuple information comprises a partial set of tuple information used for determining a traffic flow associated with the fragmented packet.

12. The network device of claim 8, wherein the first set of tuple information comprises a source IP, a destination IP, and a protocol.

13. The network device of claim 8, wherein the second set of tuple information comprises a source port and a destination port.

14. The network device of claim 8, wherein the indication of the first set of tuple information and the second set of tuple information is transmitted to a computing system that performs at least one of (i) load balancing, (ii) security monitoring, or (iii) quality of service (QoS) analytics for traffic within a network.

15. A non-transitory computer-readable medium comprising computer program code that, when executed by one or more processors, performs an operation comprising:
- receiving, at a network device, a fragmented packet of an internet protocol (IP) packet, wherein the fragmented packet is subsequently received relative to an initial fragmented packet of the IP packet and wherein the fragmented packet comprises a first set of tuple information;
- determining, by the network device, an entry of a hash table associated with the IP packet, based on the first set of tuple information and a fragment identifier (ID) within the fragmented packet;
- retrieving, by the network device, a second set of tuple information associated with the fragmented packet from the entry of the hash table;
- transmitting, by the network device, an indication of the first set of tuple information and the second set of tuple information; and
- upon determining, by the network device, that the fragmented packet is a last fragmented packet of the IP packet, invalidating, by the network device, the entry of the hash table after retrieving the second set of tuple information from the entry of the hash table.

16. The non-transitory computer-readable medium of claim 15, the operation further comprising:
- receiving, at the network device, the initial fragmented packet of the IP packet, wherein the initial fragmented packet comprises the first set of tuple information and the second set of tuple information;
- determining, by the network device, the entry of the hash table based on the first set of tuple information and a fragment ID within the initial fragmented packet; and
- storing, by the network device, the second set of tuple information at the entry of the hash table.

17. The non-transitory computer-readable medium of claim 15, the operation further comprising determining, by the network device, a traffic flow associated with the fragmented packet based on the first set of tuple information and the second set of tuple information.

18. The non-transitory computer-readable medium of claim 15, wherein the first set of tuple information comprises a partial set of tuple information used for determining a traffic flow associated with the fragmented packet.

19. The non-transitory computer-readable medium of claim 15, wherein:
- the first set of tuple information comprises a source IP, a destination IP, and a protocol; and
- the second set of tuple information comprises a source port and a destination port.

20. The non-transitory computer-readable medium of claim 15, wherein the indication of the first set of tuple information and the second set of tuple information is transmitted to a computing system that performs at least one of (i) load balancing, (ii) security monitoring, or (iii) quality of service (QoS) analytics for traffic within a network.

* * * * *